United States Patent [19]

Heilala

[11] Patent Number: 4,813,688
[45] Date of Patent: Mar. 21, 1989

[54] SEALING FLANGE

[75] Inventor: Antti-Jussi Heilala, Starnberg, Fed. Rep. of Germany

[73] Assignee: Oy Safematic Ltd., Muurame, Finland

[21] Appl. No.: 97,875

[22] Filed: Sep. 17, 1987

[30] Foreign Application Priority Data

Apr. 6, 1987 [FI] Finland .................................. 871484

[51] Int. Cl.$^4$ .............................................. F16J 15/34
[52] U.S. Cl. ...................................................... 277/27
[58] Field of Search ................... 277/27, 30, 81 R, 88, 277/89

[56] References Cited

U.S. PATENT DOCUMENTS

| 3,560,063 | 2/1971 | McClusky et al. | 277/27 X |
| 4,413,830 | 11/1983 | Pietsch | 277/27 |
| 4,688,806 | 8/1987 | Heilala | 277/27 X |

FOREIGN PATENT DOCUMENTS

| 2205195 | 9/1972 | Fed. Rep. of Germany . |
| 2301082 | 8/1973 | Fed. Rep. of Germany . |
| 3544872 | 7/1986 | Fed. Rep. of Germany . |

Primary Examiner—Donald A. Griffin
Attorney, Agent, or Firm—Cushman, Darby & Cushman

[57] ABSTRACT

A sealing flange for fastening a slide ring seal of a rotatable shaft to an unrotatable wall. The sealing flange includes an annular fastening element provided with fastening points for bolt fastening in the vicinity of the outer periphery thereof. The inner periphery of the fastening element includes a projection in which a counter surface for fastening a part of the slide ring seal is provided on a peripheral surface extending in the radial plane. In order to provide a simple fastening with advantageous manufacturing costs, the annular fastening element is a separate part. The projection is formed in a separate fitting ring fitted on the inner periphery of the fastening element.

4 Claims, 2 Drawing Sheets

SEALING FLANGE

BACKGROUND OF THE INVENTION

The invention relates to a sealing flange for fastening a slide ring seal of a rotatable shaft to a non-rotatable wall, comprising an annular fastening element provided with fastening points in the vicinity of the outer periphery thereof, for bolt fastening, and with a projection on the inner periphery thereof, in which projection a counter-surface for fastening a part of the slide ring seal is provided on a peripheral surface extending in the radial plane.

This kind of sealing can be carried out by means of various kinds of seals. The type of the seal is chosen, e.g., according to the requirements of each particular application. Such seals include single-acting seals, double-acting seals, internal seals, external seals, sequential seals called tandem seals, and seals to be positioned against each other.

In principle, there are numerous seal types and possibilities. In most cases, an equally great number of fastening flanges has been constructed previously for fastening these different types of seals to the device.

For this reason, costs caused by the different fastening flanges are disadvantageously high. Each part has to be adapted separately for each device and each seal.

To solve the problem, different kinds of multipurpose and standard flanges have been developed in the art. Such standard flanges include the solution disclosed in U.S. Pat. No. 4,269,417. By means of this prior solution, single-acting slide ring seals mounted internally or externally can be fastened to devices of various types.

A disadvantage of this prior solution is that its use is limited to the fastening of single-acting seals only. A single-acting seal means a seal comprising a single pair of slide faces, e.g. a static counter ring and a rotatable seal.

SUMMARY OF THE INVENTION

The object of the invention is to provide a sealing flange by means of which the disadvantages of the prior art can be eliminated. This is achieved by means of a sealing flange according to the invention, which is characterized in that the annular fastening element is a separate part and that the projection is formed in a separate fitting ring to be fitted on the inner periphery of the fastening element.

An advantage of the invention is that it enables an unlimited number of different kinds of seals, both single-acting and double-acting, to be fastened to different kinds of pumps and other such devices. The user benefits from the flange mainly in that it is versatile and, as a consequence, the store of replacement parts can be smaller. A further advantage of the invention is that savings can be obtained in the manufacturing costs because the separate fastening element can be manufactured in large series and even of a cheaper material than the fitting ring which is exposed to corrosion due to the product to be sealed.

BRIEF DESCRIPTION OF THE DRAWINGS

The invention will be described in the following in more detail by means of some preferred embodiments of the invention shown in the attached drawings, in which.

DETAILED DESCRIPTION

Figure 1:
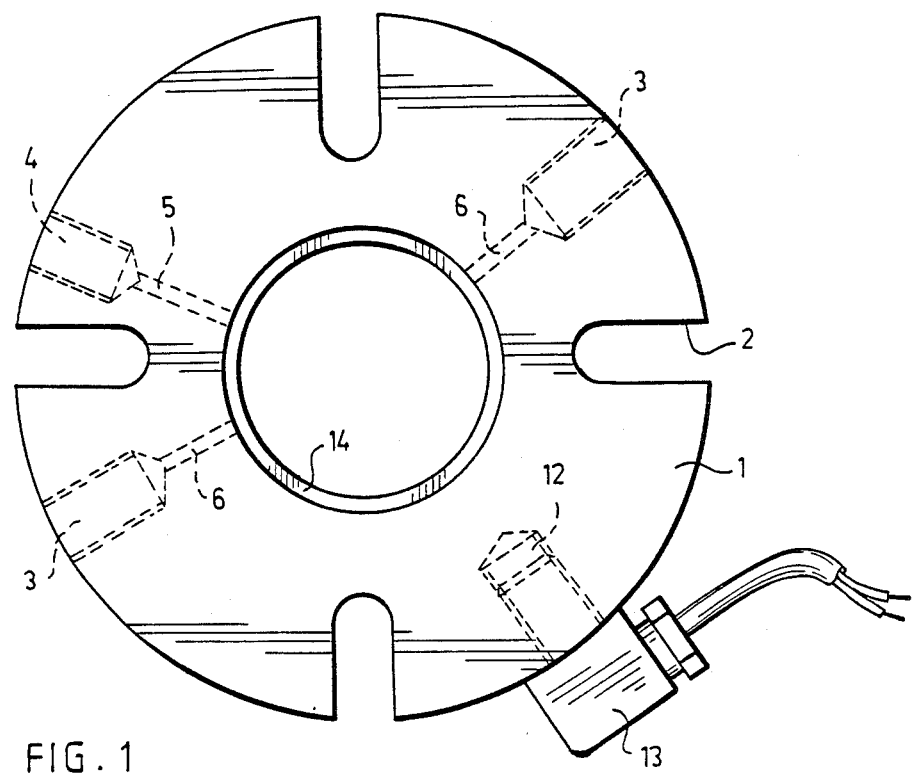
FIG. 1 is a front view of the flange according to the invention.
Figure 2:
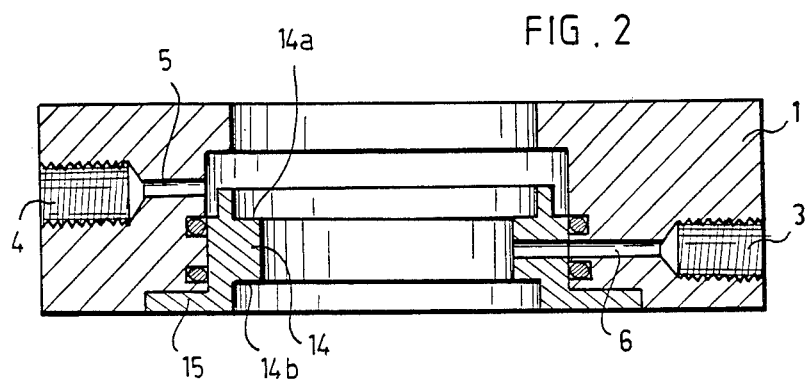
FIG. 2 illustrates the flange of FIG. 1 seen in a cross-section along the line 2—2 shown in FIG. 1.

FIGS. 1 and 2 illustrate one embodiment of the invention. The reference numeral 1 indicates an annular fastening element. The fastening element 1 is provided with fastening points 2 for bolt fastening. The fastening points 2 may be e.g. holes through which bolts can be passed so that the fastening element 1 can be attached to the back wall of a pump, for instance.

The fastening element 1 may further be provided with threaded borings 3 in which e.g. cooling liquid hoses can be fastened so that the cooling liquid can be threadedly introduced through borings 6 in the vicinity of the slide faces of the seal. Furthermore, the fastening element 1 may be provided with a threaded boring 4 and a boring 5 through which, e.g., sealing medium can be circulated from the delivery side of the pump, through a sealing space, and back to the pump, thus obtaining a constant turnover of the product in the sealing space.

The fastening elements are arranged to form a separate part on the inner periphery of which a separate fitting ring 15 can be fitted. A projection 14 is formed on the inner periphery of the fitting ring 15. Those surfaces of the projection which are positioned in radial plane are arranged to form counter surfaces (i.e., axially facing shoulders) 14a, 14b, and the slide ring 15 can be fastened to the fastening element 1 e.g. by means of O-rings, as shown in FIG. 2.

Figure 3:
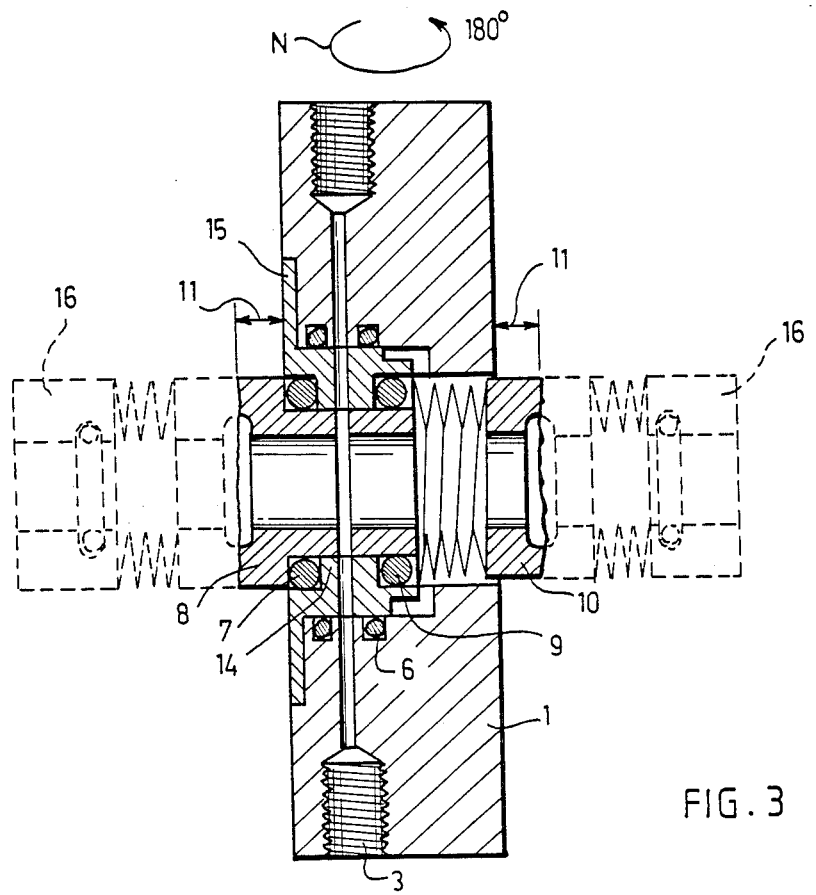
FIG. 3 illustrates the flange of FIGS. 1 and 2 in a specific mounting situation.

FIG. 3 illustrates the sealing flange of Figures 1 and 2 in a specific mounting situation. As appears from FIG. 3, the static counter ring 8 or the static sealing 10 of the slide ring seal can be fastened to the projection 14 e.g. by means of O-rings 7, 9. Seals 16 rotating with the shaft and necessary for the operation of the proper seal are indicated by means of broken lines in FIG. 3.

The projection 14 is arranged to be positioned axially asymmetrically with respect to the fastening element 1. It is thereby possible to turn the sealing flange 180° upside down without that a causing the mounting distance 11 to be changed. This turning is indicated in FIG. 3 by means of the arrow N. In other words, the projection 14 is so positioned that the different kind of sealing parts 8, 10 mounted within the sealing flange project from the flange to the same extent, i.e. the distance 11. This detail enables the flange to be turned upside down without causing the positions of the slide faces to be changed.

Figure 4:
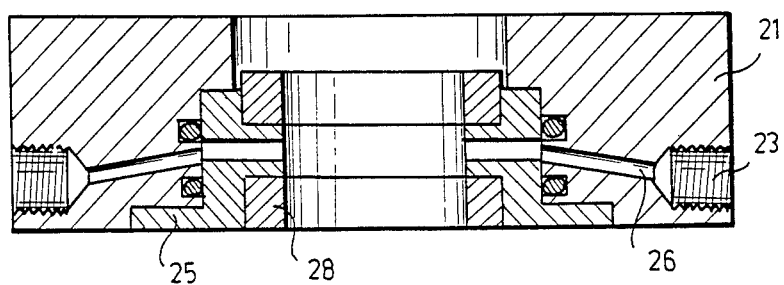
FIG. 4 illustrates another embodiment of the flange according to the invention.

FIG. 4 illustrates another embodiment of the invention. The example of FIG. 4 essentially corresponds to the example of FIGS. 1 and 2 with the exception that a fitting ring 25 differs from the fitting ring 15 of the example of FIGS. 1 and 2. In FIG. 4, the fastening element is indicated with the reference numeral 21, the borings for cooling liquid with the reference numerals 23 and 26. The sealing ring, which is fastened to the fastening element 21, is indicated with the reference numeral 28. As to the manufacture and operation, the example of FIG. 4 corresponds essentially to the example illustrated in FIGS. 1 to 3.

As can be seen from the examples described above, an essential aspect of the invention is that sealing rings 8, 10, 28 of very many different kinds can be fastened to one and the same fastening element 1, 21 in a simple way. It is thereby possible to reduce manufacturing costs and at the same time simplify the replacement part store. The basic part, i.e. the fastening element, is always similar and the fitting rings are selected according to the seal. The fastening element may be manufactured, e.g., of a cheaper material than the fitting elements, because it is only the fitting element that will be exposed to the corrosion effect of the product to be sealed. The invention can be made even more versatile by shaping the annular inner periphery of the fastening element 1, 28 in such a way that the sealing part of the slide ring seal can also be fastened directly to the fastening element, i.e. without a fitting ring. This detail increases the usability of the basic part, i.e. the fastening element, in different situations.

The above embodiments are by no means intended to restrict the invention, but the invention can be modified within the claims in various ways. Accordingly, it is clear that the sealing flange or the parts thereof need not be exactly similar to those shown in the figures, but other kind of solutions are possible as well. The fitting rings, for instance, can be chosen according to the desired seal, etc. The fastening elements can, of course, be provided with a connection 12 for a sensor monitoring the operation of the seal. This sensor may be e.g. an electric sensor 13. This connection solution is shown generally in FIG. 1. The sensor and the connection can, of course, be of some other kind than is shown in FIG. 1. The connection is not obligatory, but the basic idea of the invention can also be applied without a connection monitoring the operation of the seal.

I claim:

1. A sealing flange for fastening a slide ring seal of a rotatable shaft to a non-rotatable wall, comprising:
   an annular fastening element having an outer periphery and an axial bore with an inner periphery;
   said annular fastening element being provided about said outer periphery thereof with fastener means by which said annular fastening element, in use, can be fastened to a non-rotatable wall;
   said annular fastening element being adapted to have a rotatable shaft extend axially thereinto so as to be radially spacedly surrounded by said inner periphery;
   an annular fitting ring provided as a distinctly separate element relative to said annular fastening element, said fitting ring being fitted in said axial bore, against said inner periphery;
   means providing an annular, radially inward projection on said fitting ring, said projection including means providing an axially-facing annular shoulder adapted for engaging, in use, a seal element of a slide ring seal.

2. The sealing flange of claim 1, wherein:
   said fitting ring has two axially opposite ends, said projection has two axially opposite ends at least one of which is axially recessed in relation to a corresponding one of said ends of said fitting ring, and said axiallyfacing annular shoulder is provided on a recessed said end of said projection.

3. The sealing flange of claim 1 wherein:
   said fitting ring has two axially opposite ends, said projection has two axially opposite ends, both of which are axially recessed in relation to corresponding ones of said fitting ring, said axially-facing annular is provided on one recessed said end of said projection and a second axially-facing annular shoulder adapted for engaging, in use, a sealing element is provided on the other recessed said end of said projection.

4. The sealing flange of claim 3, wherein:
   said projection is axially offset from being located midway between opposite ends of said annular fastening element.

* * * * *